(12) United States Patent
Kalmuk et al.

(10) Patent No.: US 7,246,167 B2
(45) Date of Patent: Jul. 17, 2007

(54) COMMUNICATION MULTIPLEXOR USING LISTENER PROCESS TO DETECT NEWLY ACTIVE CLIENT CONNECTIONS AND PASSES TO DISPATCHER PROCESSES FOR HANDLING THE CONNECTIONS

(75) Inventors: David C. Kalmuk, Toronto (CA); Jon A. Lind, Beaverton, OR (US); Hebert W. Pereyra, Toronto (CA); Xun Xue, Markham (CA)

(73) Assignee: International Business Machines Corporation, Armonk, NY (US)

( * ) Notice: Subject to any disclaimer, the term of this patent is extended or adjusted under 35 U.S.C. 154(b) by 898 days.

(21) Appl. No.: 10/412,428

(22) Filed: Apr. 14, 2003

(65) Prior Publication Data

US 2004/0122953 A1 Jun. 24, 2004

(30) Foreign Application Priority Data

Dec. 23, 2002 (CA) .................................. 2415043

(51) Int. Cl.
*G06F 15/16* (2006.01)
(52) U.S. Cl. ...................................... 709/227; 709/229
(58) Field of Classification Search ................ 709/227, 709/228, 229, 226, 206, 223, 217; 701/208; 710/306

See application file for complete search history.

(56) References Cited

U.S. PATENT DOCUMENTS

| 5,410,709 | A | 4/1995 | Yu |
| 6,075,939 | A | 6/2000 | Bunnell et al. |
| 6,604,046 | B1 * | 8/2003 | Van Watermulen et al. 701/208 |
| 6,728,821 | B1 * | 4/2004 | James et al. ................. 710/306 |
| 6,769,022 | B1 * | 7/2004 | DeKoning et al. ........... 709/223 |
| 2002/0055982 | A1 * | 5/2002 | Goddard ...................... 709/217 |
| 2002/0198943 | A1 * | 12/2002 | Zhuang et al. .............. 709/206 |
| 2004/0122953 | A1 * | 6/2004 | Kalmuk et al. .............. 709/227 |

OTHER PUBLICATIONS

Hughes, Larry, A Multicast Interface for UNIX 4.3, Jan. 1988, pp. 15-27.

* cited by examiner

*Primary Examiner*—Le Hien Luu
(74) *Attorney, Agent, or Firm*—Greg Plow

(57) ABSTRACT

A communications multiplexor includes dispatcher processes for monitoring client connections. The dispatcher processes detect activity on those connections, and then pass active physical (client) connections to agent processes for servicing. Transfer is done through specific connection queues that are associated with a set of agents. A multi-queuing structure permits pooling of agents on a set of shared resources thereby reducing time required to switch between different client connections. After an agent has serviced a given connection, the agent returns that connection to the agent's dispatcher (there is a static assignment between connections and dispatchers), and then reads the next unit of work from the agent's associated connection queue. This structure may be scalable while allowing optimal performance when passing physical connections between processes.

30 Claims, 8 Drawing Sheets

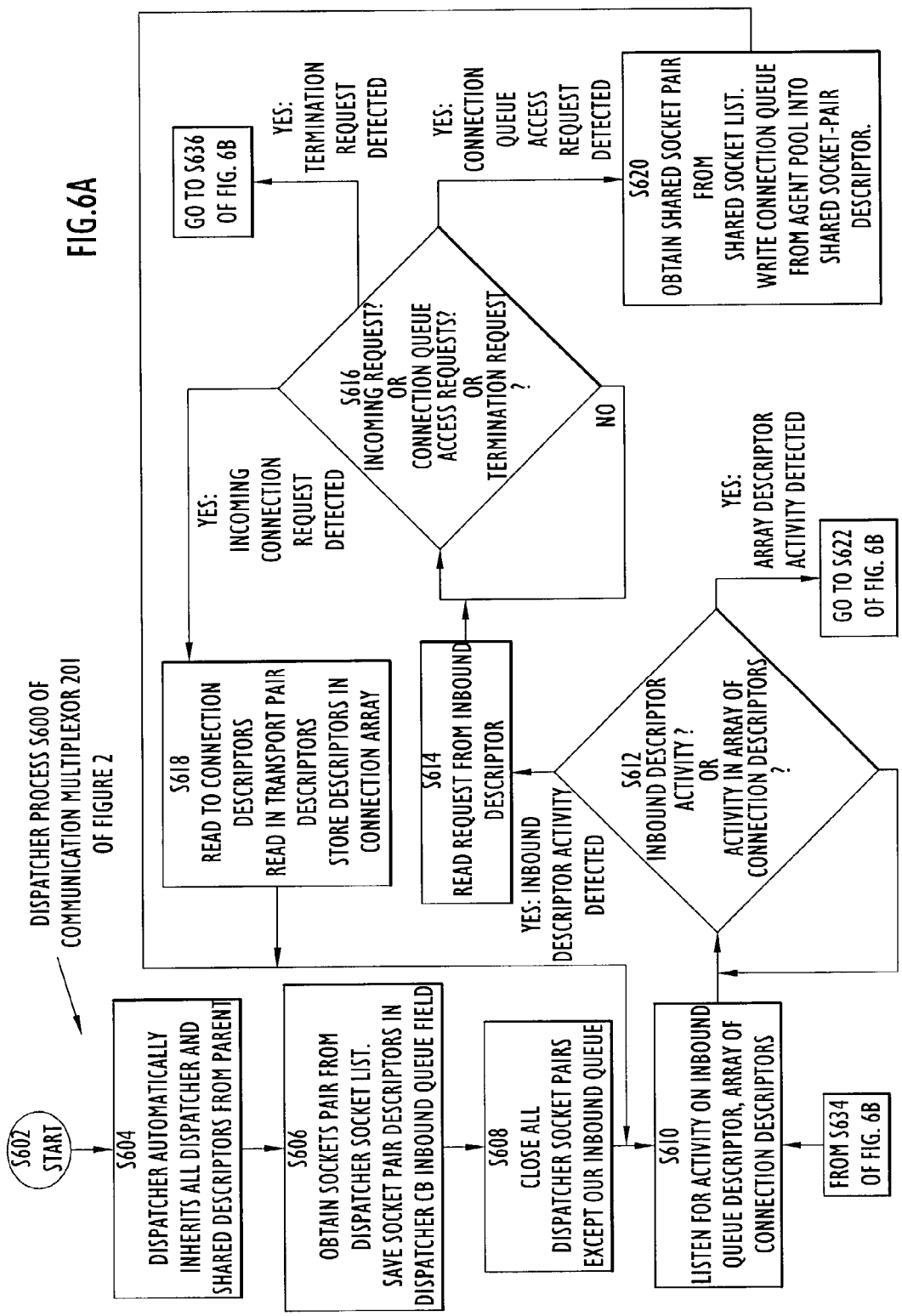

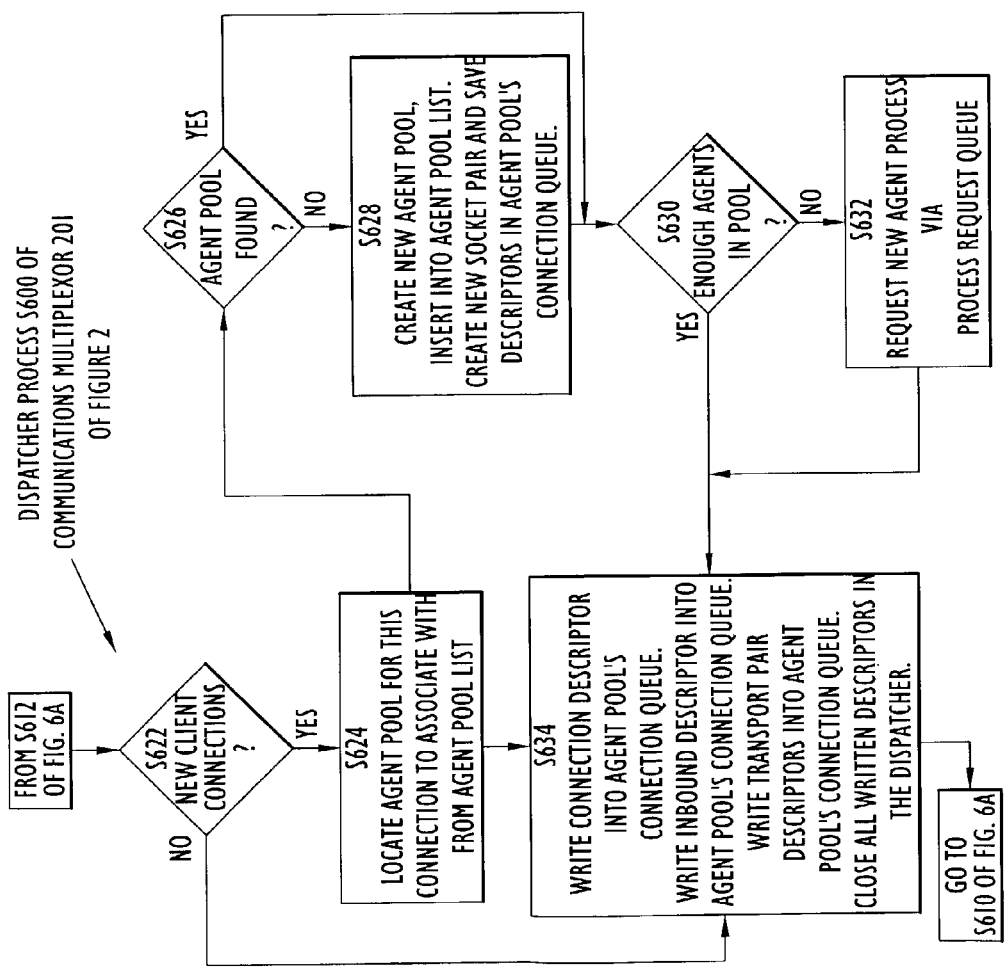
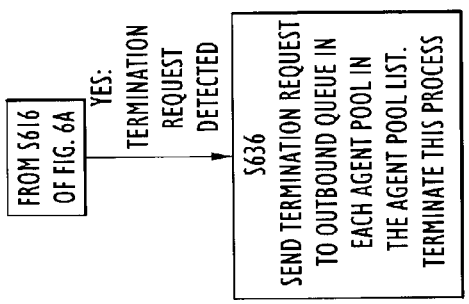
FIG. 6B

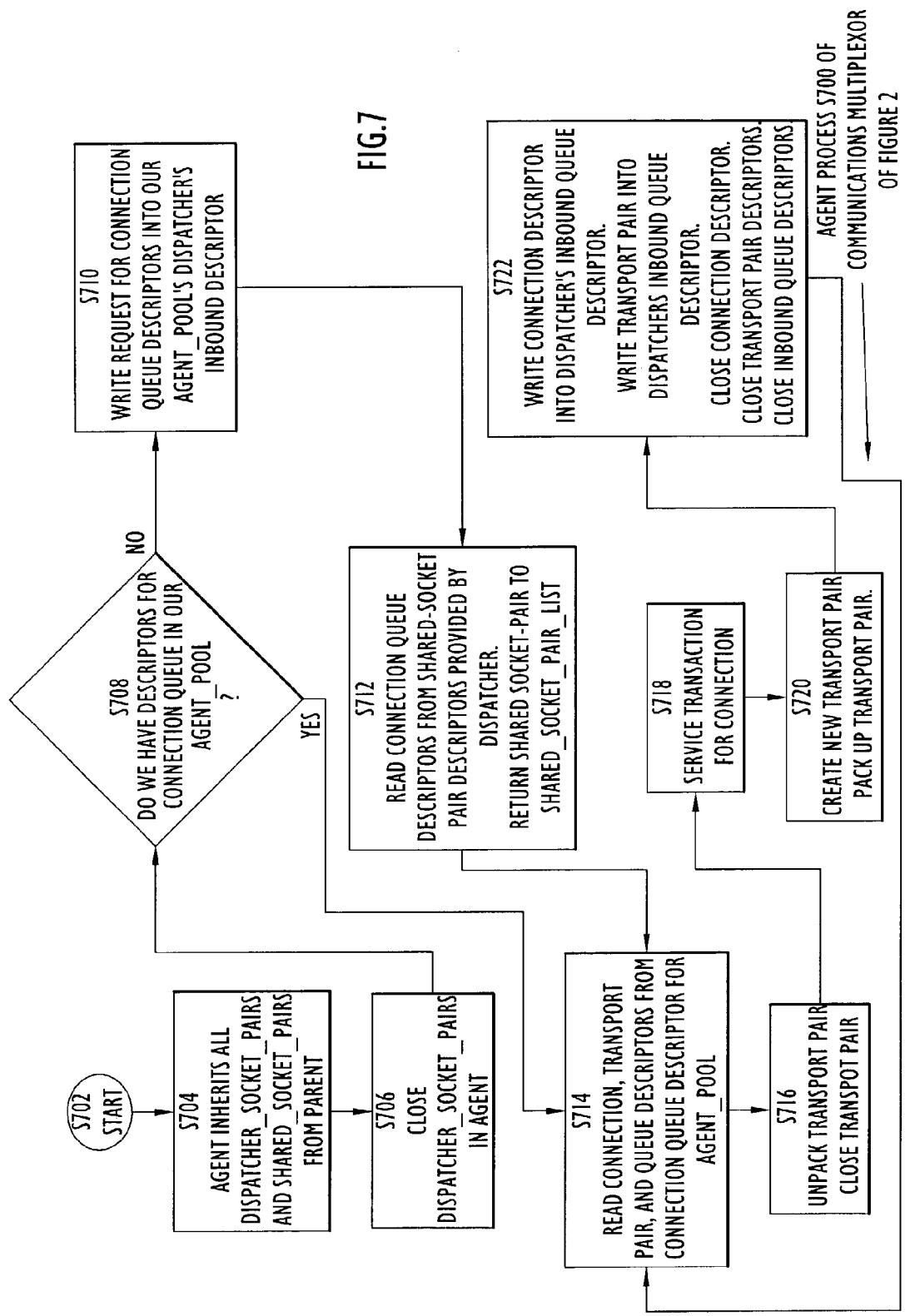

COMMUNICATION MULTIPLEXOR USING LISTENER PROCESS TO DETECT NEWLY ACTIVE CLIENT CONNECTIONS AND PASSES TO DISPATCHER PROCESSES FOR HANDLING THE CONNECTIONS

FIELD OF THE INVENTION

The present invention relates to database systems in general. In particular, the present invention relates to a communication multiplexor for use within a database system implemented on a data processing system.

BACKGROUND

FIG. 1 shows a known database system 100 having a communications multiplexor 103. The database system 100 is stored in memory 116 of a data processing system 114. Also stored in memory 116 is the UNIX operating system. Client connections 102 are handled by a communications multiplexor 103 which includes dispatcher processes 104, reply queues 106, request queues 108 and agent processes 110. The communications multiplexor 103 connects client connections 102 to a physical database 112. Each client connection may include a request for requesting data or information about the data stored in physical database 112. Dispatcher processes 104 includes dispatcher process 'A', dispatcher process 'B', and dispatcher process 'C'. Agent processes 110 includes agent process 'D', agent process 'E', agent process 'F', agent process 'G', and agent process 'H'. Each dispatcher process 'A', 'B', and 'C' handles a respective group of client connections 102 (that is, handles one or more client connections). For example, FIG. 1 shows that dispatcher processes 'A' and 'B' handle three client connections each, and dispatcher process 'B' handles one client connection. The dispatcher processes 104 listen for activity on client connections 102 that they respectively handle. When a specific dispatcher process, such as dispatcher process 'A', detects activity on a respective client connection, the specific dispatcher process reads the request from that active client connection, writes the request into shared memory, and writes the detected request into request queue 108. The purpose for writing the request to shared memory (which happens to cause a significant communications bottle neck problem) will be further explained as follows: the client has sent a request to the database system over the client connection. The dispatcher process will read this request from the client connection. The dispatcher process must pass that client request to the agent process using some mechanism or manner. A way to achieve this mechanism is to write the request into a memory location and then pass a pointer (that is, a reference) to that memory location containing the request to the agent process via the request queue. The agent process will then know which memory location to read or to examine in order to process the request. Since by default, however, memory in process-based operating systems is private to a given process, the dispatcher process must write this request into an area of shared memory (that is, memory that is shared by multiple processes) so that the agent process will be able to read and process that memory shared memory location. It is a disadvantage to have a multitude of processing reading contents stored in shared memory locations because this causes operation to significantly slow down.

Subsequently, an available agent process, such as agent process 'E', reads the request stored in the request queue 108, and performs the service requested in the request, such as obtaining information from the physical database 112. Then, the agent process 'E' writes a reply into shared memory and writes the reply into the reply queue 106 (for example, the reply is written to reply queue 'J') for subsequent handling by the dispatcher process 'A' (that is, the dispatcher process that owns the active client connection that supplied the original request). The reply is written to shared memory for the same reason as described above; it is desired to have the agent process write a reply to shared memory and then pass a reference to that memory to the dispatcher process, so that the dispatcher process can then write the reply from that shared memory location to the client connection. To do this once again it is desired to write the reply to memory that is accessible (that is, shared) by both the agent process and the dispatcher process.

The dispatcher process 'A' then reads the reply currently stored in the reply queue 'J', and writes that reply into the appropriate client connection that provided the original request. The most likely implementation of the known database system would involve the dispatcher process copying the request from the client connection to shared memory, and then passing a pointer (or a reference or a handle) to that shared memory through the request queue to an agent (to those skilled in the art, this could be referred to as 'passing the request'). The request queue itself could have multiple incarnations. It could be a linked list of pointers in shared memory, or it could also be one of the operating system inter-process communication mechanisms such as a socket or a pipe. Disadvantageously, when a dispatcher process handles a multitude of client connections, the dispatcher process becomes a significant bottle neck in the communications mutliplexor 103 because the dispatcher process reads and writes a multitude of requests (that came from the client connections) to locations in shared memory.

Known database system 100 does not pass client connections between dispatcher processes. Each client connection is kept with a respective dispatcher process for the lifetime of the client connection. Also, each dispatcher process performs all communication tasks with the client connections. On one hand, the operation of a communications multiplexor 103 is simple. On the other hand, the dispatcher processes 104 become a communications bottleneck in which client connections that have become newly active with a respective dispatcher process may have to wait for other client connection communications to be completely serviced before those newly active client connections may become serviced by an available dispatcher process. Client connections that become active on a single dispatcher process may have to wait for that dispatcher process to become available for passing requests to the request queue. A dispatcher process may be tied up because it is currently performing other communications for other client connections that are current being handled (hence the communications bottleneck occurs). Also, because a dispatcher process may be handling the communication connections for an active client connection, and the requests are being serviced by separate agent processes, the requests and replies must be passed between the dispatcher processes 104 and the agent processes 110 via shared memory. In general, the database system will use shared memory to store all the major shared data structures in the system (anything that can be accessed by dispatcher processes and agent processes). All this means is that the main data structures (such as the reply or request queues in this case) are stored in a shared place in memory where any process in the database system can access them. Also, shared memory is used extensively for communications between processes, in which one process writes information into a chunk of shared memory (or shared memory chunk) and another process once notified of the correct address of the memory can read those details. On database systems with a limited amount of shared memory, this situation may result in a scalability penalty which is generally inconvenient.

Communications multiplexor 103 includes request queues (comprised of reply queues 106 and request queues 108) for passing requests and replies between dispatcher processes 104 and agent processes 110. Use of these queues leads to two disadvantages. Firstly, on database systems that perform parallel execution of client requests, the single queue increasingly becomes a contention point as only one process may operate on it at a time. It is believed that the queue is more of a contention or bottleneck point in preventing agent processes from processing requests in parallel. Secondly, since any given agent process may serve any given client connection, this removes the ability to pool private resources associated with a given database 112 (for example, with a given set of agent processes). In UNIX operating systems having limits on the amount of shared memory and in which certain resources are kept private, this may result in a performance penalty.

Communications multiplexor 103 provides operation for handling a file table state that client connections may need to maintain besides the actual connection descriptor (that is, client connection descriptors). The connection descriptor refers to the file descriptor for the client connection, that is, the OS (operating system) handle to the client connection. No special mention of any such mechanism is made, and the most straightforward way of handling this with the communications multiplexor 103 may be to have those files open in the same dispatcher process as the client connection lives or continues to persist. Inconveniently, there may be a full scalability penalty for each of these files occupying the file table space of the dispatcher processes. Additionally, there may be performance penalties for the dispatcher processes performing any I/O (Input/Output) operations needed on these files.

Accordingly, a solution that addresses, at least in part, this and other shortcomings is desired.

SUMMARY

It is an object of the present invention to obviate or mitigate at least some of the above mentioned disadvantages.

A method and a system for a communication multiplexor for use within a database system implemented on a data processing system is provided, in which a pool of dispatcher processes manage multiple client connections by passing requests to agents as the requests are received, and client connections themselves are passed to the agent processes. This arrangement improves the use of parallelism during client communications, and reduces the communication workload from dispatcher processes to prevent the dispatcher processes from becoming a communications bottleneck by requiring agent processes to read and to write requests (from client connections) to and from memory. It will be appreciated that using agent process reduces the impact of reading and writing to shared memory in view of known communications multiplexors (which requires dispatcher processes to read and write a multitude of requests to and from shared memory). Advantageously, the present invention reduces the communications bottle neck that may be created by known communications multiplexors.

Client connections are monitored by dispatcher processes which detect activity on those client connections, and then pass the active physical (client) connections to agent processes for servicing. The transfer is done through specific connection queues that are associated with a set of agent processes. This multi-queuing model allows us to pool agents (also known as agent processes) on a set of shared resources (or could also be called common resources) thereby reducing the time required to switch between different connections. After an agent has serviced a given connection, the agent will return that connection to the agent's dispatcher process (there is a static assignment between connections and dispatcher processes), and then reads the next unit of work from the agent process' connection queue. As will be described later, this arrangement permits implementation of this architecture in a scalable fashion while still allowing optimal performance when passing physical connections between processes.

A UNIX socket pair based mechanism is also provided to improve the balance between performance and scalability of a communications multiplexor (normally there is a trade off between performance and scalability in this context). Disjoint pools of shared socket pairs (or pools of shared and disjoint-shared socket pairs) are created, and these pools permit the communications multiplexor to be scalable while allowing certain processes shared access to the sockets for ease of implementation. Also included is operation for passing of socket pairs that are private to a process through shared socket pairs as a method of sharing socket pairs amongst small groups of processes on-demand. This arrangement implements an affinity with socket pairs shared in this manner to allow reuse of cached private socket pairs which maintains performance at a substantially acceptable level.

An embodiment of the present invention provides a database management system for a database for handling data access by a plurality of client connections, the database management system including a listener process, agent processes, and wherein the listener process detects active client connections containing client requests and passes the active client connections to the agent processes, and the agent processes execute requests for the active client connections against the database.

An embodiment of the present invention provides a computer program product having a computer-readable medium tangibly embodying computer executable instructions for directing the data processing system to implement the database management system described above.

An embodiment of the present invention provides an article including a computer-readable signal-bearing medium, and means in the medium for directing a data processing system to implement the database management system described above.

An embodiment of the present invention provides a method for multiplexing client connections within a database system implemented on a data processing system having a database, the method including having a listener process pass detected active client connections to respective agent processes, the detected active client connections each having a request embedded therein, having an agent process execute a request against the database, the request extracted from a detected client connection, and having the agent process handle shared memory read and write operations to process the embedded request.

An embodiment of the present invention provides a computer program product having a computer-readable medium tangibly embodying computer executable instructions for directing the data processing system to implement the method described above.

An embodiment of the present invention provides an article including a computer-readable signal-bearing medium, and means in the medium for directing a data processing system to implement the method described above.

An embodiment of the present invention provides, in a database system implemented on a data processing system, a communication multiplexor for executing requests against data contained in a database stored in the data processing system, the communications multiplexor implementing the method described above.

An embodiment of the present invention provides a computer program product having a computer-readable medium tangibly embodying computer executable instructions for implementing the communication multiplexor of as described above.

An embodiment of the present invention provides an article including a computer-readable signal-bearing medium, and means in the medium for directing the data processing system to implement the communication multiplexor described above.

BRIEF DESCRIPTION OF THE DRAWINGS

A better understanding of these and other embodiments of the present invention can be obtained with reference to the following drawings and description of the preferred embodiments, in which:

FIGS. 6A and 6B show a dispatcher process of the communications multiplexor of FIG. 2; and FIG. 7 shows an agent process of the communications multiplexor of FIG. 2.

Similar references are used in different figures to denote similar components.

DETAILED DESCRIPTION

The following detailed description of the embodiments of the present invention does not limit the implementation of the invention to any particular computer programming language. The present invention may be implemented in any computer programming language provided that the OS (Operating System) provides the facilities that may support the requirements of the present invention. A preferred embodiment is implemented in the C or C++ computer programming language (or other computer programming languages in conjunction with C/C++). Any limitations presented would be a result of a particular type of operating system or computer programming language and would not be a limitation of the present invention.

Figure 1:
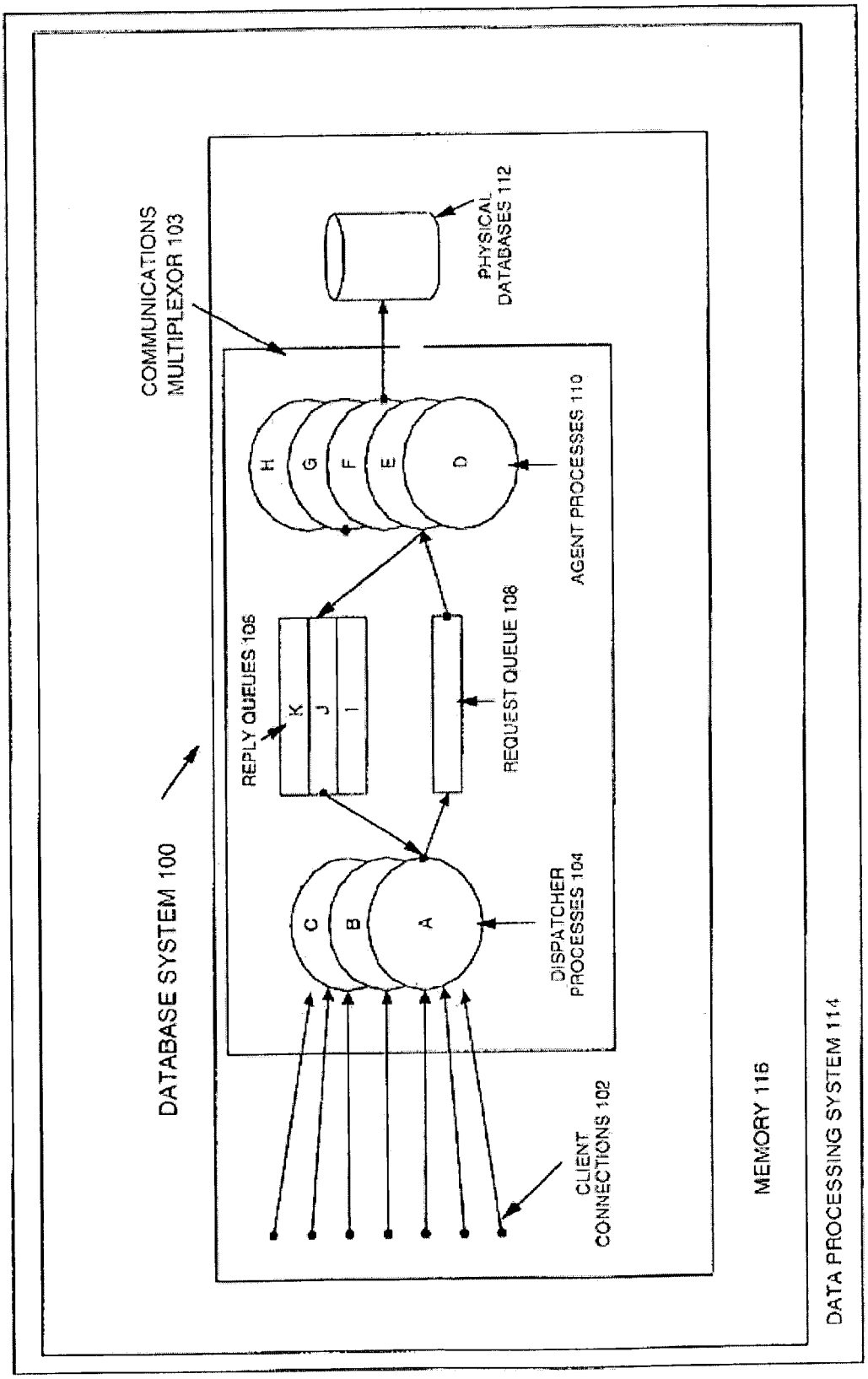
FIG. 1 shows a known database system having a known communications multiplexor.
Figure 2:
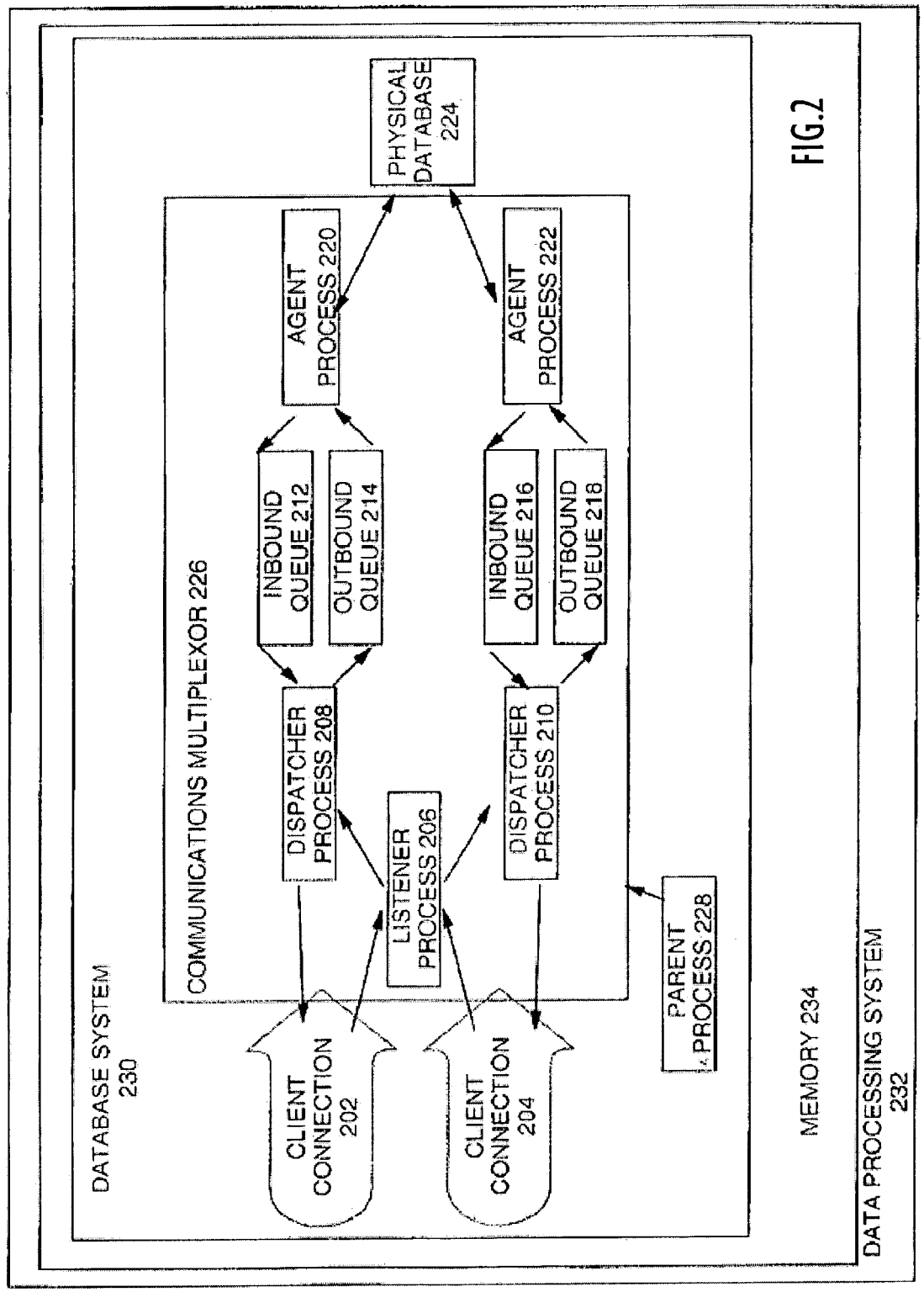
FIG. 2 shows a database system including a communications multiplexor.

FIG. 2 shows a data processing system 232 having memory 234. The data processing system is adapted to implement a database system 230 which may include a database management system (not depicted) and a database 224 for containing data. Within memory 234 is stored a communications multiplexor 226, a physical database 224 containing data that may be indexed for improved access to the contained data, and a client connection 202 and a client connection 204 each having a request (not depicted) for obtaining data or information about the data stored in the physical database 224. Also stored in memory 234 is a parent process 228 for building communications multiplexor 226 in the manner that will be described below.

It will be appreciated that database system 230 may be stored in memory 234 or stored in a distributed data processing system (not depicted). Data processing system 232 includes a CPU (Central Processing Unit—not depicted) operatively coupled to memory 234 which also stores an operating system (not depicted) for general management of the data processing system 232). An example of data processing system 232 is the IBM™ ThinkPad™ computer. The database system 230 includes computer executable programmed instructions for directing the data processing system 232 to implement the embodiments of the present invention. The programmed instructions may be embodied on a computer readable medium (such as a CD disk or floppy disk) which may be used for transporting the programmed instructions to the memory 234 of data processing system 232. Alternatively, the programmed instructions may be embedded in a computer-readable, signal-bearing medium that is uploaded to a network by a vendor or supplier of the programmed instructions, and this signal-bearing medium may be downloaded to memory 234 from the network (not depicted) by end users or potential buyers.

Communications multiplexor 226 includes listener processes, dispatcher processes, agent processes, and a parent process. A listener process includes operation for accepting an incoming or newly active client connection and passes the incoming client connection to an available dispatcher process. A dispatcher process includes operation for monitoring or detecting the activity of a set of client connections, and passes an active client connection to an agent process for further handling or processing (via an outbound queue associated with the dispatcher process). An agent process includes operation for handling a client connection request (that is, the agent process obtains the information being requested in the client connection request), and then passes the client connection back to a dispatcher process for further monitoring of the client connection. A parent process includes operation for initializing the communications multiplexor and creating the listener processes, dispatcher processes, and agent processes.

Communications multiplexor 226 processes requests contained in client connection 202 and client connection 204 by obtaining replies that satisfy the requests within respective client connection 202 and client connection 204. The communications multiplexor 226 includes listener process 206, dispatcher process 208, dispatcher process 210, agent process 220, agent process 222, outbound queue 214, outbound queue 218, inbound queue 212, and inbound queue 216. Listener process 206 monitors the data processing system 232 for newly active or incoming client connections. Client connection 202 and client connection 204 are established by a client program running either on data processing system 232 or on another data processing system operatively connected to data processing system 232 via a network and interfacing systems. Once client connection 202 and client connection 204 are detected by the listener process 206, the listener process 206 establishes the client connections and then passes the established (detected) client connection 202 to dispatcher process 208 by writing client connection 202 into inbound queue 212, and then passes the client connection 204 to dispatcher process 210 by writing the client connection 204 into inbound queue 216. Once activity is detected on the client connection 202 or detected on the client connection 204 by the dispatcher process 208 or by the dispatcher process 210 respectively, dispatcher process 208 and dispatcher process 210 handles active or detected active client connection 202 and client connection 204 by passing client connection 202 and client connection 204 to outbound queue 214 and outbound queue 218 respectively. Outbound queue 214 and outbound queue 218 pass their respective client connections 202 and 204 onto agent process 220 and agent process 222 respectively. Agent process 220 and agent process 222 extract requests that are embedded in client connection 202 and client connection 204 respectively. The extracted requests are executed against physical database 224. Once physical database 224 provides reply data that satisfies the extracted requests, agent process 220 and agent process 222 assemble replies having the reply data back to their respective client connection 202 and client connection 204, and then passes client connection 202 and client connection 204 back to their respective inbound queue 212 and respective inbound queue 216. Inbound queue 212 and inbound queue 216 in turn pass client connection 202 and client connection 204 back to dispatcher process 208 and dispatcher process 210 respectively. Dispatcher process 208 and dispatcher process 210 then continue to monitor [as mentioned once before, client connections are released by an agent releasing the connections, and then not returning them to the dispatcher] client connection 202 client connection 204 respectively. The logical connections between processes and queues are maintained until database system shuts down. Alternatively, the logical connections may be reassigned to other processes or queues accordingly. The advantage provided by the present invention is that agent process 220 and agent process 222 each handle memory read and write operations when processing requests embedded or contained in their respective client connection 202 and client connection 204. This arrangement reduces a potential communications bottle neck associated with known communications multiplexors.

It will be appreciated that pooling of agent processes on a set of shared resources (that is connection queues and dispatcher queues) reduces time required to switch between different client connections. It is assumed that there are common resources that are associated logically with the queues (that is the key point here). For example, one queue per database is given, and a bunch of undefined "things" that the agent process may need to initialize in its private memory to process requests on this database. By staying with the same queue, the agent only needs to do the initialization of this "stuff" once, rather than potentially on every request if it served requests on different databases each time.

After a given agent process has serviced a given client connection, the given agent process returns that given client connection to a given dispatcher process associated with the given client connection (note that there is a static assignment between connections and dispatchers). The given agent process proceeds to read the next unit of work (that is, another client connection request) from a connection queue associated with the given dispatcher. As will be described later, the preferred embodiment permits implementation of this structure in a scalable fashion while allowing optimal performance when passing client connections between processes.

The following describes another embodiment for passing client connections. In the UNIX operating system and in some other operating systems, a socket is a software object that connects an application to a network protocol. In the UNIX operating system, for example, a program can send and receive TCP/IP messages by opening a socket and reading and writing data to and from that socket. This simplifies program development because the programmer need only worry about manipulating the socket and can rely on the operating system to actually transport messages across the network correctly. Note that a socket in this sense is completely soft, in that the socket is a software object and it is not a physical component.

To implement the outbound connection queues and the inbound connection queues, socket pairs (for example, UNIX domain socket pairs) may be used for passing client connections. A socket pair can be treated as a queue of client connections being transferred from one process to another process (such as from a dispatcher process 'A' to an agent process 'C'). As a rule, when an outside process (that is, when another process) is sending or receiving client connections to and/or from a dispatcher process, the call (that is a call invokes a routine in a programming language) on the socket pair will be blocking calls, inside the dispatcher process will be non blocking, and any client connections that cannot be written are then pooled in an overflow area for subsequent reprocessing. By 'blocking', it is meant that this term is the term defined in the socket-pair documentation for the UNIX operating system, in that the OS requires the process to wait until the sending operation on the socket-pair can be completed. By 'non blocking', it meant that this term refers to a 'non-blocking' call on a socket-pair as defined as one that will either succeed immediately or will return an error message information the caller that he must retry the request.

In an alternative embodiment, stream pipes may be used in the manner that socket pairs are used in the preferred embodiment. A stream pipe is a temporary software connection between two programs or commands. Normally, an operating system accepts input from a keyboard and sends output to a display screen. Sometimes, however, it is useful to use the output from one command as the input for a second command, without passing the data through the keyboard or the display screen. One of the best examples of pipe usage is linking the command that lists files in a directory to a command that sorts data. By piping the two commands together, the files may be displayed in sorted order. In UNIX and DOS (Disk Operating System), the pipe symbol is a vertical bar (|). The DOS command to list files in alphabetical order, therefore, would be: DIR | SORT.

Returning to the preferred embodiment, a shared pool of socket pairs may be used as a generic means of file-descriptor transfer between processes in the system. A file descriptor transfer is a mechanism for passing an open file descriptor from one process to another. The process with the open file descriptor uses a function with a command argument. The second process obtains the file descriptor by calling the function with another command argument. For example, a parent process prints out information about a test file, and creates a pipe. Next, the parent process creates a child process which opens the test file, and passes the open file descriptor back to the parent through a pipe. The parent process then displays the status information on the new file descriptor.

Socket pairs (there is no distinction between the creation of a socket pair that may become a private socket pair or a shared socket pair, in which the distinction is made by how the socket pairs are forked after creating these socket pairs) may be associated or assigned to a particular process or processes. The pool of shared socket pairs for generic file descriptor transfer may be implemented by opening the socket pairs during server startup process, and inheriting the socket pairs in all forked children (which includes listener processes, dispatcher processes, and agent processes). At this point, each process will have a distinct entry in it's (private) file-table referencing the socket-pair. In this way it is understood that the socket pairs are associated with that process. The pool of shared socket pairs is advantageously used as a reusable resource for performing generic transfer of file descriptors (that is, the transfer of file descriptors) from one process to another. A process can reserve one of these socket pairs, use the reserved socket pairs to transfer file descriptors to another process, and then the receiving process can return the socket pair to the pool of available socket pairs upon completion. If no socket pairs are available when required by a process, a block on this resource (that is, all socket pairs) may be imposed until one of the socket pairs becomes available. It will be appreciated that a socket pair can be used for implementing connection queue 'I' and dispatcher queue 'J' for example.

Disjoint socket pools are used to enhance scalability of the database system 200. It is to be understood that a disjoint socket pool is a pool of disjointly shared socket pairs which is a term that may aptly describe what has been done here. A pool of socket pairs is an arbitrary collection of socket pairs assigned to a specific process. The term disjoint pool of socket pairs is used here to mean that some pools of shared pairs can be associated with certain types or sorts of processes. For example, one group of socket pairs may be associated with a dispatcher process, while other group of socket pairs may be associated with another dispatcher process or an agent process (and so on).

A disjoint shared socket pool is used for passing client connections into dispatcher processes. A shared socket pool (that is, a pool of shared socket pairs) is created in the parent process, and is then closed in selective processes, which means that socket pairs that are shared by some processes and not shared by other processes. This is split up as follows:

A) each dispatcher process has access to a shared socket pair that can be treated as a connection queue, which will be referred to as the dispatcher's inbound queue. Client connections passed to a dispatcher process are passed through this connection queue; and B) each listener process has access to all inbound type queues in database system 200, each dispatcher process has access to its own inbound type queue (that is, the dispatcher process only has access to the inbound type queue it receives connections on, not the other inbound type queues used by the other dispatchers to receive their respective client connections), and each agent process has no access to inbound type queues.

The limit that the preferred embodiment may impose upon scalability of database system 200 is that there may not be more dispatcher processes than there is room for inbound type socket pair queues in a listener process. For example, for a file table size of 1000 entries or 2000 entries in combination with a shared pool of 32 socket pairs would leave room for 468 or 1468 dispatcher processes, in which a dispatcher process may manage several hundred client connections, which would provide scalability of up to 100,000 client connections (assuming a relatively small file table size). A file table with 1000 entries in combination with a shared pool of 32 socket pairs may occupy 64 entries in a listener process file table, which would leave 936 entries in the file table for storing inbound socket pair queues. In a preferred embodiment, this would leave room for 936 inbound socket pair queues, hence 936 dispatcher processes would be available in communications multiplexor 201. In an alternative embodiment, each inbound socket pair queue may occupy the file table entries, which would lead to 936 file table entries that would allow 468 inbound socket pair queues, and hence 468 dispatcher processes would be available in the communications multiplexor 201. In other words, 468 and 1468 are the maximum number of dispatcher processes in the communications multiplexor 201 with file table sizes of 1000 entries and 2000 entries respectively.

As may be inferred from the above description, listener processes can pass incoming client connections to any dispatcher that may be chosen. Agent processes, which do not have access to inbound queues of dispatcher processes, must go through a slightly more complicated process which will be described later.

Returning back to the preferred embodiment, a set of connection queues may be implemented as socket-pairs that are initially private to the single process which created them. These connection queues may be created by dispatcher processes. A dispatcher process manages client connections, groups those managed client connections into subgroups, and creates a socket pair (that is, a connection queue), which are subsequently referred to as a 'private' socket-pair since initially only the dispatcher process may access it. One of these 'private' socket pairs is then associated with each subgroup of client connections. The private socket pair or outbound connection queue is also associated with a subgroup of agents, which are in turn pooled on some private (to the group) resources (say stuff related to a given database file for example). Client connections also become associated with these queues by nature of the database file they are performing requests on. A single dispatcher may manage multiple instances of these queues. When a client connection is detected to be an active client connection by a dispatcher process, the active client connection is queued in the client connection's associated private socket pair (outbound queue for that connections' subgroup). Multiple client connection queues associated with a dispatcher process allow effective pooling of agent processes on these private socket pairs (the outbound connection queues) as will be discussed below.

Now will be described the implementation of agent process affinity and caching. Groups of agent processes associated with outbound connection queues (described previously) are kept. When an agent process is initially associated with an outbound connection queue, the agent process requests access to the associated outbound connection queue, and also requests access to an inbound queue of a dispatcher that owns the associated outbound connection queue. It will be appreciated that the dispatcher queue can be broadly called an inbound queue, and the connection queue can be broadly called an outbound queue (both of these queues are technically connection queues). The shared socket pool is used to transfer the descriptors for these queues (that is, both the inbound queue and the connection queue) to the agent process. The shared socket pool is described as the generic method for file transfer and shown as one of the embodiments; the shared socket pool is not the inbound or outbound queues. Using these shared sockets is necessary for the agent process to gain access to the inbound and outbound queues for that dispatcher process (which is not illustrated)

Since this protocol involves multiple context switches (an agent process requests access from a dispatcher process, the dispatcher process obtains a shared socket pair and transfers descriptors, the agent process reads descriptors and returns shared socket pair), an agent affinity is defined to this connection queue so that the agent process may reuse the transferred descriptors, and may amortize the cost of the queue descriptor transfer across subsequent operations on the connection queue and the inbound queue.

Active client connections are assigned to a single dispatcher process for the duration of activity of the active client, so that an agent process with an affinity to a particular connection queue and affinity to a particular inbound queue of a dispatcher process may continue to reuse these cached resources (that is, the inbound queue and outbound queue) without penalty.

The following describes scalable file state transfer through transport pairs. Transport pairs are a usage of socket pairs which is further described below. During transaction processing, agent processes may be required to write information to external files which are associated with a client connection. An example of this is the data links feature used in DB2™ (manufactured by IBM) which allows data to be stored in external files. The communications multiplexor of the preferred embodiment requires these files to persist between transactions (that is, the processing of client connections), and hence these file are to be transferred between multiple agent processes. The challenge is to maintain the state for multiple files per client connection without significantly reducing scalability of the communications multiplexor 201. For example, if there are five files each associated with a client connection, there may potentially be a scalability decrease by a factor of 5. The preferred embodiment exploits the fact that files will remain open while being passed through a socket pair as long as the files are in transit. This means that multiple file descriptors may be written into a socket pair, then those file descriptors are closed in the sending process while maintaining those files open for future use, thus incurring a fixed cost of holding onto the socket pair descriptors while a client connection is not active. When the files are once again needed in the agent process, the file descriptors may be read out of the socket pair, thus reestablishing those file descriptors in the agent process and continue processing. This permits maintaining a potentially large amount of file table states per client connection while reducing impact on scalability.

Figure 3:
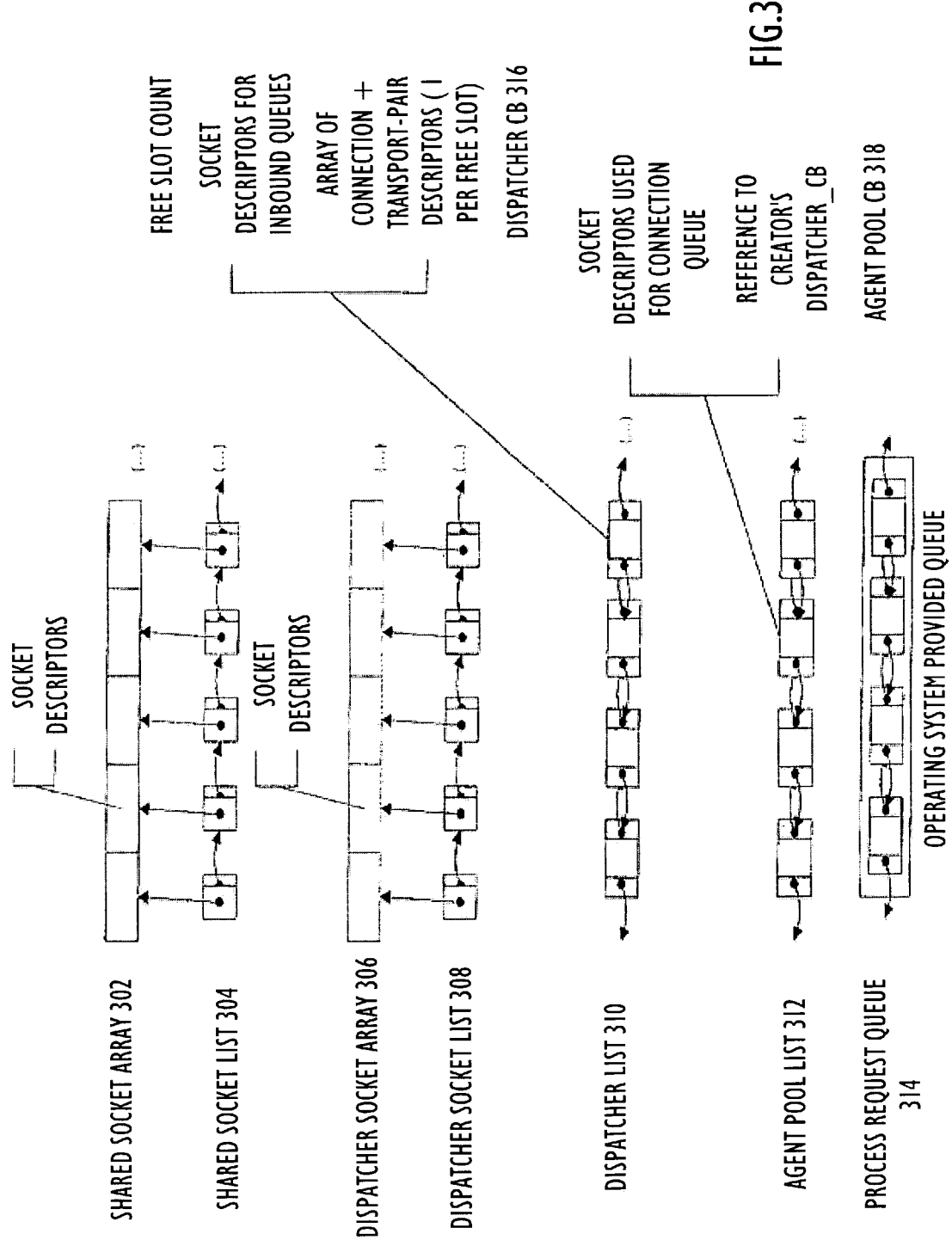
FIG. 3 shows data structures contained in the communications multiplexor of FIG. 2.

FIG. 3 shows data structure 300 of communication multiplexor 201 of FIG. 2. A shared socket array 302 is a global array (that is, an array of elements) that holds socket descriptors for a pool of shared socket pairs. A single element of shared socket array 302 includes two integers representing the inbound and outbound ends of the domain socket pair. It is appreciated that a domain socket pair refers to a UNIX domain socket pair. The shared socket array 302 has an arbitrary length of 32 (that is, the numeric length which means that there are 32 elements in the array) for the purposes of the preferred embodiment. The size of the shared socket array 302 is sufficiently large to prevent excessive contentions for the resource (a resource is shared socket pairs contained in the array), but also small enough to avoid consuming too much file table space in each process (that is, any process that makes use of this resource or data structure in the system, the usage of which is described below). In the embodiments, this resource includes those processes and agent processes and dispatcher processes described below.

A shared socket list 304 is a linked list containing references to socket pairs in a shared socket array 302 that are currently free or available. The shared socket list 304 is assumed to be synchronized via some sort of critical section or mutex.

Mutex is the acronym for a Mutual Exclusion object. In computer programming, a mutex is a program object that allows multiple program threads to share the same resource, such as file access, but not simultaneously. When a program is started, a mutex is created with a unique name. After this stage, any thread that needs the resource must lock the mutex from other threads while the thread that locks the mutex uses the resource. The mutex is set to unlock when the data is no longer needed or the program is finished. Critical sections and mutexes both serve the same purpose (more or less), which is to synchronize or serialize access to shared resources or data. Mutex is an operating system resource that can be allocated in shared memory by a process. Processes can make a call to the operating system to obtain the mutex. Only one process will be allowed to obtain or hold the mutex at once, and all other processes will be forced by the operating system to wait until that process has released the mutex, at which point the operating system will select another process that will be given the mutex. The purpose of the mutex is to allow serialization of access to shared resources, to prevent race conditions from occurring, where shared data might be corrupted as multiple processes try to modify it at the same time.

Returning to the preferred embodiment, processes in a communications multiplexor 201 of FIG. 2 can obtain a shared socket pair for usage by removing an element from a shared socket list 304. When the process that obtained the shared socket pair is finished with the shared socket pair, that process must return the shared socket pair to the shared socket list 304 (it's actually the identification/handle of the shared-socket-pair that is returned to the list).

A dispatcher socket array 306 is similar to a shared socket array 302. The dispatcher socket array 306 holds descriptors for a dispatcher socket pool (that is, a spool of shared socket pairs assigned to a dispatcher process). The socket pairs of the dispatcher socket pool are inherited as shared initially in all processes, and are assigned to dispatcher processes to be used as inbound queues of dispatcher processes. The size of array 306 is determined by the maximum workload that a user wants a communication multiplexor 201 to support. The number of dispatcher processes that can be created in the communications multiplexor 201 depends directly on the size of array 306; hence, the size of array 306 determines scalability of communications multiplexor 201. But scalability of the communications multiplexor may determine or impact the scalability of the database system as a whole. The limits on the scalability are defined by the size of a file table of a parent process, which must be large enough to accommodate the entire array 306.

A dispatcher socket list 308 is a linked list of all free elements in a dispatcher socket array 306. Synchronized as in a shared socket list 304, individual dispatcher processes obtain their associated dispatcher socket pairs upon creation by removing an element from this list 308.

A dispatcher list 310 is a doubly linked list of dispatcher Control Blocks (CBs). The list 310 is assumed to be synchronized via a mutex or critical section.

An agent pool list 312 is a doubly linked list of agent pool Control Blocks (CBs). The list 312 is assumed to be synchronized via a mutex or critical section.

A process request queue 314 is any operating system implemented message queue or Inter Process Communications (IPC) mechanism used for communication with a parent process. Operating systems usually provide several such mechanisms for use by other programs, one such example being message queues.

A dispatcher CB 316 is a control block associated with an individual dispatcher process. CB is shorthand for Control Block which is a name for indicating the information used during the execution of a program of a dispatcher process. The dispatcher CB 316 contains a count of the number of free slots available for incoming client connections (note that these slots are used for containing incoming client connections which is described a little further down, and it is an arbitrary value that the user may set). The dispatcher CB 316 also contains descriptors for an inbound queue socket pair of a dispatcher process. There is an array in each dispatcher CB 316 with each element for holding a client connection descriptor and for holding two transport pair descriptors (one element per free connection slot).

An agent pool CB 318 is a control block associated with an individual agent pool (that is, a pool of socket pairs associated with an agent pool). The agent pool CB 318 contains descriptors for a client connection queue socket pair (referred to as an outbound queue). The agent pool CB 318 also contains a reference to a creating or owning dispatcher CB of a dispatcher process. The agent pool CB 318 can also hold handles for any resources associated with an agent pool, but the actual resources in question are outside the scope of the present invention.

Figure 4:
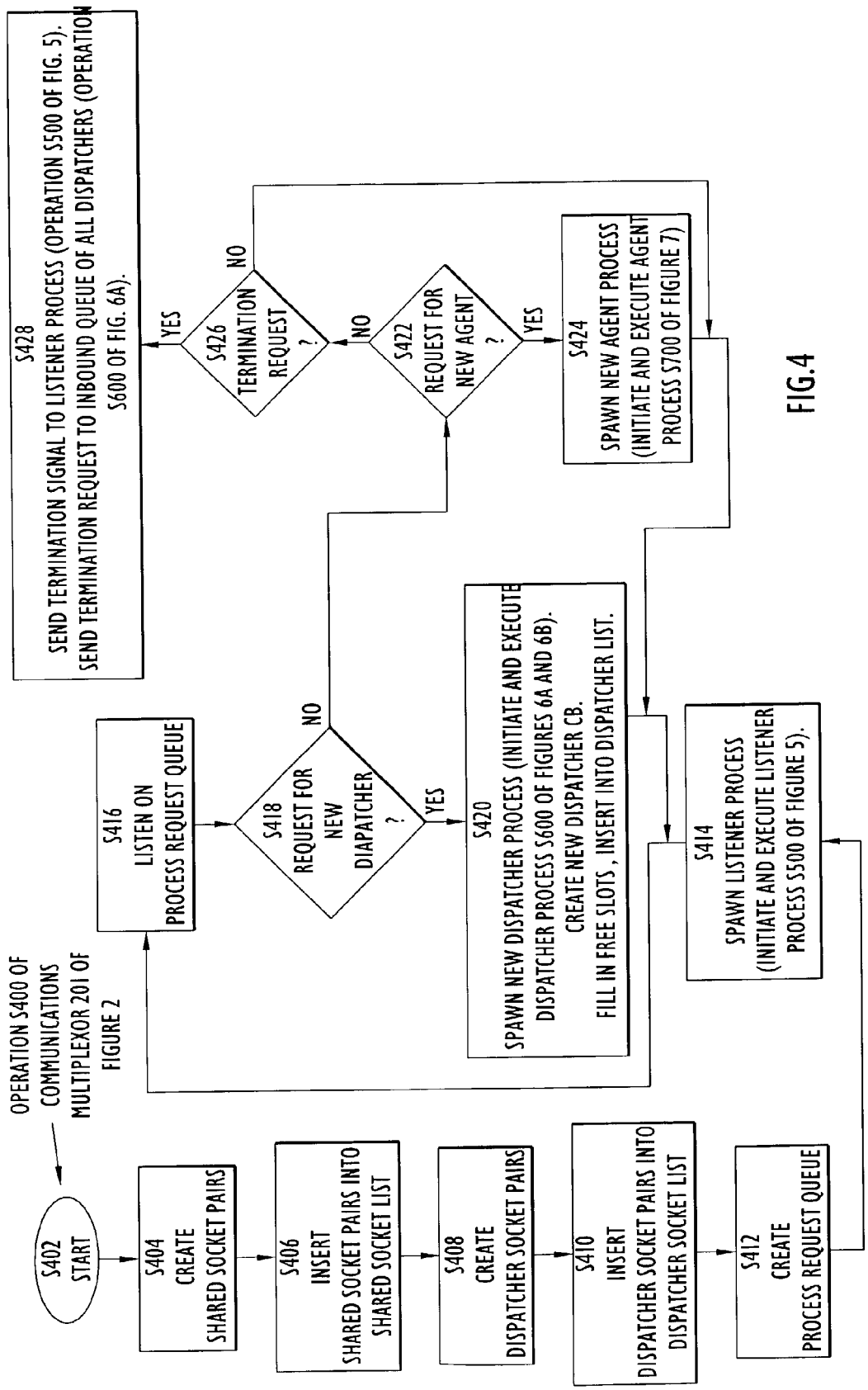
FIG. 4 shows operation of the communications multiplexor of FIG. 2.

FIG. 4 shows operation S400 of communications multi-plexor 201 of FIG. 2. Operation 402 includes starting a parent process. The parent process sets up resources that will be shared amongst all processes on a database system 200 of FIG. 2, and then forks all the processes that are needed initially to run the database system. The parent process forks any other processes needed later in the execution of the database system as requested by any of the existing system processes. In an alternative embodiment, the parent process may include operation for launching the database system program or database management system (DBMS).

Operation S404 includes, for each element in a shared socket array 302 of FIG. 3, opening up a new socket pair, and storing the descriptors in array elements of the shared socket array 302. As described in the description of structure 300 of FIG. 3, an arbitrary array length of 32 elements may be assigned. In an alternative embodiment, a stream pipe may be used as a substitution for a socket pair.

Operation S406 includes, for each element in the shared socket array 302 of FIG. 3, inserting the element into a shared socket list 304.

Operation S408 includes, for each element in a dispatcher socket array 306, opening up a new socket pair and storing the descriptors (of the new socket pair) in an array element of the dispatcher socket array 306. The size of the array 306 is determined by a calculation which includes the maximum number of desired client connections and the number of client connections allowed per dispatcher process. The number of array elements of array 306 that are required may be calculated to satisfy the number of dispatcher processes that are needed. For example, one array element may be needed per dispatcher process.

Operation S410 includes inserting dispatcher socket pairs into a dispatcher socket list 306.

Operation S412 includes making an Operating System (OS) call to create a process request queue 314 of FIG. 3.

Figure 5:
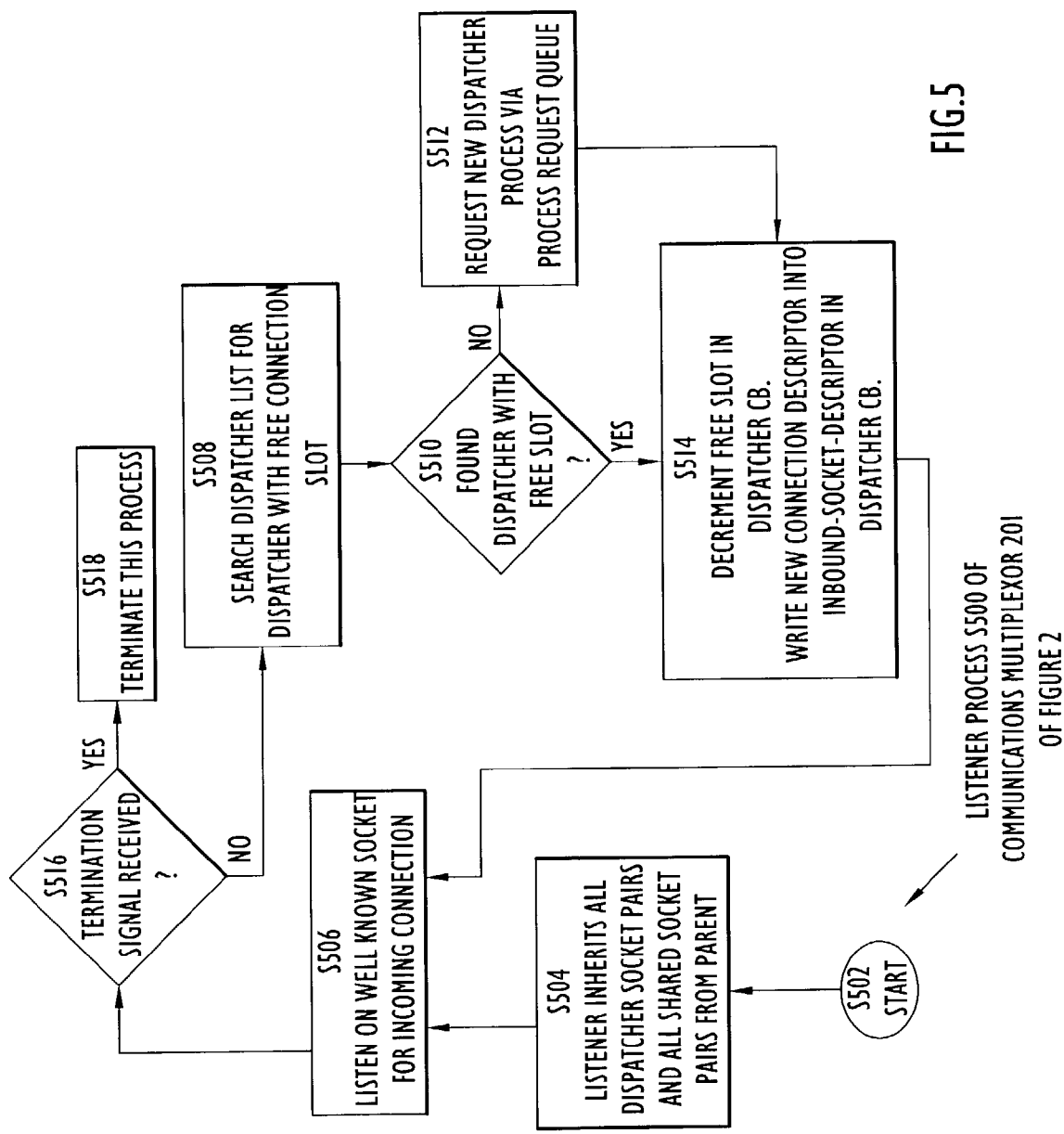
FIG. 5 shows a listener process of the communications multiplexor of FIG. 2.

Operation S414 includes forking a listener process from a parent process (that is, initiating and executing a listener process S500 of FIG. 5). It is appreciated that 'spawning' and 'forking' may be used interchangeably. Forking implies that a single process duplicates the environment of the process into another identical process, with a 'fork' occurring in the execution path of each process. An important aspect of the preferred embodiment is that a 'child' process from the forking operation inherits the file resources of the parent.

Operation S416 includes listening on a process request queue 314, and waiting for requests for a dispatcher process.

Operation S418 determines whether there was a request for a new dispatcher process. It is the listener process that would request a new dispatcher process (refer to operation S512). If there was no request for a new dispatcher, control is transferred to operation S422. If there was a request for a new dispatcher, control is transferred to operation S420. Optionally, operation S418 includes determining whether there this is a request for a new dispatcher. This operation allows the parent process to determine what type of request it has received. This operation may be a single conditional such as "request for new dispatcher?" or "request for new agent?", and the like.

Operation S420 includes forking a dispatcher process (that is, initiating and executing a dispatcher process S600 of FIG. 6A and FIG. 6B) once it has been determined that there is a request for a new dispatcher process. Operation S420 also includes allocating a dispatcher CB 316, initializing free slots value, and inserting the dispatcher CB 316 into a dispatcher list 310. The free slots initial value may be arbitrarily set to 500 (that is, 500 free slots). It will be appreciated that this value should not be larger than the available file table space in a given process minus the space required for shared socket pairs.

Operation S422 determines whether a request was made for a new agent process once it has been determined that there are no requests for a new dispatcher process. If a request was made for a new agent process, control is transferred to operation S424. If no request was made for a new agent process, control is transferred to operation S416. Both requests for agent processes and dispatcher processes can be passed to the parent process via the process request queue. These operations are where the parent process determines whether a given request is for an agent process or for a dispatcher process.

Operation S424 includes forking an agent process (that is, initiating or executing an agent process S700 of FIG. 7) once it has been determined that there is a request for a new agent process. Once operation S424 has been executed, control is transferred to operation S416 in which case a listening on a process request queue 314 may begin once again.

Operation S400 may be stopped by a special request on the process request queue that would be sent by some other process (which is not described in the preferred embodiment) indicating that it is desired to shut down operation S400. Shutting down operation S400 is detailed in the figures. It is within the scope of a skilled person in the art to know how to shut down operation S400. However, as an example, two other operation may be added for shutting down operation S400 (that is operation S426 and operation S428). It is understood the external request is sent to the process request queue (presumably from a shutdown operation).

Operation S426 determines whether the request received via the process request queue was a termination request. If this was a termination request, control is transferred to operation S428, otherwise control is transferred back to operation S416.

Operation S428 includes sending a signal to the listener process S500 to shut it down, then iterating over the list of dispatcher control blocks, writing a request into the inbound queue of each one telling it to shut down, and finally freeing up all resources (including all socket-pairs and shared memory), and terminating our own process, thus shutting down operation S400.

FIG. 5 shows a listener process S500 of communications multiplexor 201 of FIG. 2. Operation S502 begins a listener process S500. The listener process S500 detects incoming client connections and immediately finds a dispatcher process that can handle that detected client connection by either assigning that client connection to an existing dispatcher process, or by creating a new dispatcher processor in which that newly created dispatcher process may be assigned to the detected client connection.

Operation S504 includes allowing a listener process to inherit distinct descriptors for all files open in the parent. The parent process is the process that forked the listener process (that is operation S400). There are two processes that share this relationship (one forked the other) in which one is referred to as a parent process and the other process is referred to as a child process.

Operation S506 includes performing a listening operation, and blocking on a well known socket pairs for incoming client connections. A TCP/IP listener may be used in the preferred embodiment for implementing a listening operation. In alternative embodiments, other communication protocols may be implemented as well.

Operation S508 includes searching through a dispatcher list 310, stopping when either a first dispatcher CB with free slots remaining has been found, or when the end of the list 310 is reached.

Operation S510 determines whether a dispatcher process having a free slot is found. If a dispatcher process having a free slot is found, control is transferred to operation S514. If a dispatcher process having a free slot cannot be found, control is transferred to operation S512.

Operation S512 includes creating a request for a dispatcher process, and writing the request into a process request queue 314, and waiting on the queue 314 for a parent process to respond with a reference to a dispatcher CB.

Operation S514 includes decrementing the free slot in a dispatcher CB 316 that was found or created, and writing the new client connection descriptor into an inbound descriptor found in the dispatcher CB 316.

To stop operation S500, the parent process may signal the listener process as it was shutting down. In operation S506, the listener process would need to check for that signal, and if detected it would terminate itself. Signaling is a UNIX concept. For example, another operation, such as operation S516 (not illustrated), may include checking whether a signal was received from the parent indicating termination. If so, control is passed to operation S518. If not, control is transferred to operation S508. Then, operation S518 terminates the listener process.

FIG. 6A and FIG. 6B shows a dispatcher process S600 of communications multiplexor 201 of FIG. 2. Operation S602 begins the dispatcher process S600. The dispatcher process S600 monitors client connections for activity. Upon detecting activity on any monitored client connections, the dispatcher process S600 passes active client connections into appropriate or corresponding outbound client connection queues in which the passed client connections may then be serviced by an agent process as soon as one agent process becomes available.

Operation S604 includes permitting a dispatcher process S600 to automatically inherit a distinct copy of all the dispatcher descriptors and the shared descriptors from a parent process.

Operation S606 includes extracting (removing, obtaining) a socket pair from a dispatcher socket list 308, and then storing the descriptors of the extracted socket pair into a dispatcher CB 316 (that is, an inbound queue field).

Operation S608 includes going through a dispatcher socket array 306 and closing all socket pairs except the one socket pair that is equivalent to the descriptors in an inbound queue field of a dispatcher CB. This operation permits implementation of disjoint socket pair queues which improves or increases scalability of database system 201. No matter how many dispatcher processes are created, the number of client connections that a dispatcher process can handle remains constant.

Operation S610 includes listening for activity on an inbound queue descriptor, and listening on an array of connection descriptors. This may be implemented via a select( ) or poll( ) operation in the UNIX operating system.

Operation S612 includes determining whether there is activity present in an inbound descriptor or determines whether there is activity present in an array of connection descriptors. If there is activity present in an inbound descriptor, control is transferred to operation S614. If there is activity present in an array of connection descriptors, control is transferred to operation S622. If there is no activity detected in an inbound descriptor and no activity detected in an array of connection descriptors, operation S612 remains in a wait state until activity is detected in either an inbound descriptor or an array of connection descriptors.

Operation S614 includes, since inbound descriptor activity was detected in operation S612, reading the next request off of an inbound descriptor.

Operation S616 includes detecting whether there is an incoming connection request or whether there is a connection queue access request. If an incoming connection request is detected, control is transferred to operation S618. If a connection queue access request is detected, control is transferred to operation S620. If a termination request is detected, control is transferred to operation S636 (refer to explanation at the end of this section). If there is no detection of either an incoming connection request or a connection queue access request, operation S616 remains in a wait state until activity is detected as either an incoming connection request or a connection queue access request.

Operation S618 includes, for handling an incoming client connection, reading in the descriptor for the client connection, reading in the descriptors for the transport socket pair, and storing all three descriptors in an available slot in a connection queue array 212 of FIG. 2 (once an incoming connection request is detected).

Operation S620 includes, for handling an access request for a connection queue that is owned, removing a shared socket pair from a shared socket list 304, determining an agent pool CB 318 from the request, and then writing the descriptors for the outbound connection queue 212 to the shared socket pair obtained above. In an alternative embodiment, operation S620 may be optimized by only writing the outbound descriptor for the connection queue 212, but for the sake of simplicity this optimization is not implemented in the preferred embodiment.

Operation S622 includes, since array descriptor activity was detected in operation S612, detecting whether there is a new client connection. If there is no new client connection is detected, control is transferred to operation S634. If there is a new client connection is detected, control is transferred to operation S624.

Operation S624 includes searching an agent pool list 312 for an appropriate agent pool (that is, a pool of agent processes) for a detected client connection. It will be appreciated that persons skilled in the art know how to select such an agent pool; there are many conceivable schemes that could be used to determine whether a suitable agent pool currently exists or does not exist, and the scheme used does not have an impact on the embodiments of the present invention. Also, the type of selection that may be done may be largely determined by the specifics of the database system 200 that the embodiments of the invention are being implemented therewith.

For clarity though, the following describes one possible selection method (that is, a method for searching an agent pool list 312 for an appropriate agent pool). A user defined parameter of database system 201 called agent pool size is required which determines how many client connections may be accommodated by a single agent pool. A client connection count in an agent pool CB is also maintained. To select an appropriate agent pool, iteration may be performed across the agent pool list, and an examination of that client connection count on the current agent pool CB element is made. If the connection count is less than the user defined agent pool size, that agent pool CB is returned as the selection. If the connection count is not less than the user defined agent pool size, iteration to the next element in the agent pool list is performed. This fashion is continued until either a selection from the list is made or the end of the list is reached. If the end of the list is reached without finding a suitable agent pool CB, the 'no suitable agent pool CB was found' message may be returned. The previous description includes having two data elements in the agent pool CB which are not shown in structure 300 of FIG. 3. The criteria for selecting such an agent pool is not described here because this is known to persons skilled in the art; for example, DB2 Universal Database (manufactured by IBM) implements a fairly straightforward method for selecting such an agent pool (for which the description is appended above). It suffices to assume that an agent pool is found that meets the criteria, or the agent pool is not found.

Operation S626 includes detecting whether an agent pool is found. If an agent pool is found, control is transferred to operation S630. If an agent pool is not found, control is transferred to operation S628.

Operation S628 includes creating a new agent pool CB 31, and inserting the created agent pool CB 318 into an agent pool list 312. Any resources associated with the agent pool at this time may also be initialized. A new private socket pair is also created, and the descriptors in the connection queue fields of the agent pool CB are saved. Currently, this socket pair will be private to a dispatcher process, but the descriptors may be passed to any agent process that issues a sharing request to the dispatcher process. Also stored is a reference to the dispatcher process in the agent pool CB 318 so that the dispatcher process may be looked up from the agent pool.

Operation S630 includes determining whether there are enough agent processes in an agent pool. If there are not enough agent processes in the agent pool, control is transferred to operation S632. If there are enough agent processes in the agent pool, control is transferred to operation S634.

Operation S632 includes, since it was determined that there were not enough agent processes associated with the agent pool, creating a request for a new agent process, and writing the new agent process into a process request queue 314. The specifics of this determination is known to persons skilled in the art, and an example of how to perform this is provided for clarity as follows. A user defined parameter to the database system 201 called agent pool processes is required which will determine the maximum number of agent processes that should be associated with a single agent pool. An agent count is also maintained in an agent pool CB 318. To perform the determination whether there are enough agent processes associated with a given agent pool, the length of a client connection queue is examined for that agent pool. If the length of the client connection queue is non-zero, and the agent count value for that agent pool is less than the agent pool processes value, it is determined that there are not enough agents within the agent pool. If the length of the client connection queue for that agent pool is zero, or the agent count value for that agent pool is equal to the agent pool processes value, it is determined that there are enough agents with the agent pool. It will be appreciated that this is simply an example of an implementation method for operation S632.

Operation S634 includes writing a client connection descriptor into a socket pair of an agent pool, writing the descriptors for the inbound queue of the dispatcher process, and writing the descriptors of transport pair of this client connection. This operation also includes closing the client connection descriptor, and closing the transport pair descriptors by the dispatcher process. The transport pair is a socket pair used in the method described under the section on transport pairs. In the preferred embodiment, an agent process is given access to the inbound queue of a dispatcher process by passing the inbound queue descriptors of the dispatcher process along with the client connection descriptors through the connection queue associated with an agent pool. In an alternative embodiment, an implementation for giving agent access to the inbound queue associated with a dispatcher process may be performed via a sharing protocol as was done for the client connection queue descriptors. Once operation S634 has executed, control is transferred to operation S610 of FIG. 6A.

To stop operation S600, the parent process goes through the list of dispatcher CBs as it was shutting down, and writes a special request into each dispatcher's inbound queue. The dispatchers upon receiving that request would terminate. For example, another operation (such as operation S636) includes iterating through the agent pool list for this dispatcher process, and writing a termination request into the outbound queue for each agent pool. Operation S636 then may terminate this process.

FIG. 7 which shows an agent process S700 of communications multiplexor 201 of FIG. 2. Operation S702 begins the agent process S700. The agent process continually receives a client connection having pending work (a request) via a connection queue associated with the agent pool, serves a single unit of work on that client connection, and then passes the client connection back to the dispatcher process associated with the client connection for monitoring.

Operation S704 includes allowing an agent process to automatically inherit distinct copies of dispatcher socket pairs and inheriting shared socket pairs from a parent process.

Operation S706 includes going through a dispatcher socket array 306 and closing all descriptors. This is part of the disjoint queues portion of the preferred embodiment and this makes the file table space available in agent processes unaffected by the number of dispatcher processes currently active on database system 200.

Operation S708 includes determining whether there is access to descriptors for a client connection queue in a pool of agent processes. If there is no access to descriptors for a client connection queue in the pool of agent processes, control is transferred to operation S710. If there is access to descriptors for a client connection queue in the pool of agent processes, control is transferred to operation S714.

Operation S710 includes, since there is no access to descriptors in the client connection queue of a pool of agent processes, creating a request for those descriptors, and writing the request into an inbound descriptor of a dispatcher process. Dispatcher process reference is obtained from the agent pool CB.

Operation S712 includes, since the response from a dispatcher process contains descriptors for a shared socket pair, reading the client connection queue descriptors from a shared socket pair. There is now established access to the client connection queue. This operation further includes inserting the shared socket pair into a shared socket pair list 304 so that the shared socket pair can be reused by other processes.

Operation S714 includes reading the client connection, reading the transport pair (a transport pair is the special usage of a socket pair as described earlier in the section on transport pairs), and reading the inbound queue descriptors from the connection queue descriptor in the pool of agent processes.

Operation S716 includes reading all the descriptors present out of a transport pair, and closing the transport pair descriptors. This implements the receiving end of the file table state support discussed previously about the preferred embodiment.

Operation S718 includes servicing a transaction on a client connection 202. For the purposes of the preferred embodiment, a transaction consists of an agent process communicating with a client connection over the connection descriptor, and possibly performing some sort of work on behalf of the client connection.

Operation S720 is performed (once operation S718 is completed) and this operation includes creating a new transport socket pair, inserting any file descriptors that are desired to be preserved into the socket pair, and closing the file descriptors that were inserted (by the agent process). This implements the sending side of the file table state support previously discussed. The file descriptors that were written into the transport socket pair are now preserved, but only the file descriptors occupy two slots in the file table. These two slots are closed once the transport pair descriptors are written into the inbound queue of a dispatcher process. Note that the dispatcher process requires two file table slots to store the entire set of descriptors stored in the transport pair.

Operation S722 includes writing the client connection descriptor into the inbound queue descriptor of a dispatcher process which is associated with a pool of agent processes, writing the transport pair descriptors into the same inbound queue descriptor, closing the client connection descriptor, closing the transport pair descriptors, and closing the inbound queue descriptor (at the agent process end).

Operation S700 may be stopped. As the dispatcher process was shutting down, it would need to go through its list of outbound queues, and write a special request into each one of those queues. The agent process when reading a request from the outbound queue would have to check for this special request type, and shut down if it detected it. An operation may be added between operation S708 and operation S714 in which this added operation may include reading next request, and then checking if the request is either a termination request or a new connection. If it's a new connection, control is transferred to operation S714; otherwise, control is transferred to operation S724. Operation S724 terminates the agent process.

The embodiment of the present invention achieves a large scalability range since the file table usage is optimized across dispatchers, and most of the room remains open for client connections. Parallelism is exploited on select(s) by using multiple dispatchers, and is exploited on dispatches. A good performance profile is maintained by maintaining an agent affinity with a particular outbound queue on a dispatcher. In the general case, the client connections may be read out of the outbound connection queue as if the connection queue were a globally shared socket pair, without incurring the associated scalability costs. The preferred embodiment provides the ability to implement load balancing schemes between groups of agents pooled on particular connection queues, by detecting queues exhibiting high workloads, and moving agents between connection queues dynamically. The preferred embodiment also exploits this architecture further in other areas of the server by pairing connection queues with physical system resources, such as shared memory that may be associated with particular sets of connections (consider a group of connections on a particular database, that might share access to a shared memory set associated with that database). This allows the caching characteristics to extend beyond the communications multiplexor, thus allowing faster normal behavior to coincide with the faster normal behavior of the rest of the system, and pairing the slower boundary behavior with the slower boundary behavior of the other parts of the system as well. File table state may be maintained on behalf of connections, and transferred between agents and dispatchers without adversely affecting our scalability.

Although the description of the preferred embodiment mentioned specific variations in implementation, opportunity is now taken here to describe additional variations to the preferred embodiment, and also describe their potential inherent weaknesses. The key to the preferred embodiment is passing the physical connections across processes and so only variants of this design are considered.

The main challenge in implementing a scalable and efficient communications multiplexor on the UNIX platform, where the physical connections are actually passed around, is that use of shared domain socket pairs is made to achieve the transfer of the physical connections across process boundaries. This proves to be a nontrivial limitation which forces a tradeoff between scalability versus performance. The two variations that are considered will use only globally shared socket pairs instead of a combination of privately/partially shared socket pairs and globally shared ones. These variations are much more straightforward to implement because no fancy protocols need to be established to transfer file descriptors for private socket pairs between processes using shared socket pairs.

The first variation of the preferred embodiment considers a system that makes exclusive use of a large pool of shared socket pairs. With the large pool, these socket pairs may be reserved for specific purposes similar to those defined in the preferred embodiment, and these socket pairs may be used without concern for an unreasonable performance penalty (since each process already has access to the shared socket pairs, there is no overhead in gaining access to it, and since a large pool of these pairs is present, we do not have to reuse the shared socket pairs, thus eliminating potential waits on the resource). This approach also eliminates complexity in the overall design. Unfortunately, this approach may reduce system scalability because a large proportion of the file table in each process in the server would be reserved for these shared socket pairs which would thus leave little room for the physical client connections in the dispatchers. This would mean more dispatchers would be required for a given load, and this would have a nontrivial impact on system scalability. That fact may render this alternative embodiment as less usable to a large degree if the goal of a communications multiplexor is to achieve scalability.

At the opposite end of the spectrum, another alternative embodiment may dedicate a small pool of shared sockets as a reusable resource for passing connections between processes. This would mean, however, that care would be required to only reserved the socket pairs for a short time to avoid starving other users, meaning a single connection would only be transferred across boundaries per usage. Also, since the pool would necessarily be small, a large amount of time would be spent blocking on this resource in high load situations. Although this would provide scalability, there would be a performance trade off (relative to the preferred embodiment). There would be the added cost of additional context switches for each instance of passing a connection between processes, and also, the added cost of waiting for the shared sockets to become available. Although this alternative embodiment would be workable, the performance losses might negate the benefits gained from trying to actually pass the physical connections between processes.

The preferred embodiment of the present invention provides an optimum solution to this problem by defining a hybrid model. The preferred embodiment exploits the positive aspects of both alternative embodiments to achieve a suitable balance between performance and scalability. The balance of these factors is an advantage of the preferred embodiment.

The preferred embodiment achieves a reasonable performance profile when passing physical connections from dispatchers to agent processes and vice versa, and exploits system caching behavior by associating the connection queues (as previously described) with shared system resources that agents are pooled 'hot' on, so that the agents end up pooled hot on these resources, and the socket pairs in our multiplexor, thus achieving fast performance for normal case behavior, and slow performance only for boundary case behavior.

Another embodiment uses multiple queues to pass requests from dispatchers to agents. These queues are logically associated with agent pools, that is groups of agents that maintain an affinity with those queues, and assumed to have access to a shared set of resources. The benefit of using this arrangement is that agent processes are enabled to stay 'hot' on a set of resources, meaning that the agent processes do not need to incur any extra cost to get setup to serve a particular client connection. To illustrate, consider some shared memory sets associated with each database and that an agent pool corresponds to a single database: dispatcher processes would then route connections on that particular database to that particular agent pool, and agents for that pool would connect to the shared memory sets once. Then those agent pools would continually serve connections for that particular database without further initialization requirements. Alternatively, in the single queued model, there would be the potential for individual agents to switch back and forth between different databases, incurring the cost of disconnecting and reconnecting to different shared memory sets on every transaction.

In another embodiment of the present invention client connections are passed from dispatcher processes to agent processes through socket pairs that are private to the dispatcher. This means that for an agent process to read from that socket pair, the agent process requests that a dispatcher process pass descriptors for the private socket pair through a shared socket pair for every request. The benefit of this approach is that scalability is not impacted. If shared socket pairs were used rather than private socket pairs, a large portion of the file table would be consumed in every process with those socket pairs which would reduce scalability. The penalty of using private socket pairs here is the transfer of the descriptors from the dispatcher process to the agent process before the agent process can read from a queue. A transfer like this would involve two context switches before the agent process could read the data it wanted. In the preferred embodiment this performance penalty is reduced by caching the descriptors for the private socket pair once they are received (remember that the private queues belong to an agent pool, and agent processes stay associated to that agent pool). In other words, an agent process will request access to the socket pair from the dispatcher process once (that is, the two-context switches), and then read from that socket pair many times (that is, no context switches). Hence the end result is both scalability and performance.

The preferred embodiment uses 'transport' socket pairs to encapsulate file table state on behalf of applications without incurring a storage cost in dispatcher file table space that is linearly dependent on the number of files being stored. By creating a private-socket pair, writing all the file descriptors that are desired to be preserved, and passing only the socket pair descriptors to the dispatcher, the dispatcher process is enabled to maintain those files open in its process space at a cost of only two file descriptors. When it is desired to re-establish the open files in a new agent process, the agent receives the socket pair descriptors, and then reads out the set of files packed within, restoring the open files in its process space. The end benefit is the ability to maintain file table state without a significant cost in scalability.

Connection passing requires some form of shared socket pairs or stream pipes to transfer connections between processes. In the preferred embodiment, the notion of disjoint-shared socket pairs is introduced (that is, socket pairs that are shared, but only between certain processes). By choosing this implementation, scalability may be improved while maintaining the benefits of shared socket pairs. Listener processes have access to a set of shared socket pairs that are used as a dispatcher processor's inbound queues. The dispatcher processes, however, only have access to their own inbound queue's socket pair. This means that as more and more dispatcher processes are introduced (that is, dispatcher processes requiring more and more dispatcher socket pairs), the available file table space in each dispatcher stays the same (only two descriptors required for the inbound queue pair). The limit on the scalability of this arrangement is the size of the file table in the listener process which does not impose significant restrictions and OS resource limitations. If the disjoint-shared socket pairs were not used but rather globally shared socket pairs were used, the file table space available in a given dispatcher would decrease linearly with the number of dispatcher processes. The scalability of the database system would end up maxing out long before another database system running with the disjoint socket pair arrangement would.

In the preferred embodiment, a communications multiplexor is adapted to pass physical connections to agent processes for servicing in a process based system. Vendors with thread-based systems currently implement this. The main reason that this is not implemented in a process based data processing system is due to difficulties that have been overcome in this invention. The benefit of passing the physical connections is improved performance in that since the dispatcher processes don't need to do the physical communications they become less of a bottleneck for the data processing system.

It will be appreciated that variations of some elements are possible to adapt the invention for specific conditions or functions. The concepts of the present invention can be further extended to a variety of other applications that are clearly within the scope of this invention. Having thus described the present invention with respect to the preferred embodiment as implemented, it will be apparent to those skilled in the art that many modifications and enhancements are possible to the present invention without departing from the basic concepts as described in the preferred embodiment of the present invention. Therefore, what is intended to be protected by way of letters patent should be limited only by the scope of the following claims.

The embodiments of the invention in which an exclusive property or privilege is claimed are defined as follows:

1. A database management system for a database for handling data access by a plurality of client connections, said database management system comprising:
    a processing system to handle said plurality of client connections, said processing system including:
        a listener process to detect active client connections containing client requests;
        a plurality of dispatcher processes each to receive corresponding detected active client connections from the listener process;
        a plurality of connection queues each to receive detected active client connections from a corresponding dispatcher process; and
        a plurality of agent processes each to receive active client connections from a corresponding connection queue, extract said client requests from the received active client connections and execute the extracted client requests against said database.

2. The database management system of claim 1, wherein an agent process executes a client request against the database and sends back a reply related to the client request to the detected active client connection.

3. The database management system of claim 2, wherein said processing system further includes a shared socket pair used as an inbound queue for a dispatcher process.

4. The database management system of claim 2, wherein said processing system further includes:
    means for using multiple queues to pass client connections from dispatcher processes to agent processes; and
    means for logically associating queues with agent process pools each maintaining an affinity with an associated queue.

5. A database management system for a database for handling data access by a plurality of client connections, said database management system comprising:
    a processing system to handle said plurality of client connections, said processing system including:
        a listener process to detect active client connections containing client requests;
        a dispatcher process to receive detected active client connections from the listener process;
        a plurality of agent processes to receive the active client connections and execute the client requests against said database; and
        a connection queue to receive the detected active client connections from the dispatcher process and pass the detected active client connections to an agent process, wherein said agent process executes a client request against the database and sends back a reply related to the client request to the detected active client connection;
    wherein detected active client connections are passed from the dispatcher process to an agent process through socket pairs that are private to the dispatcher process and the agent process requests the dispatcher process to pass descriptors for the detected active client connections through a shared socket pair.

6. A computer program product apparatus including a computer readable medium tangibly embodying computer executable instructions for directing a data processing system to implement a database management system for a database to handle data access by a plurality of client connections to the database, said program product apparatus comprising:
    a listener process to detect active client connections containing client requests;
    a plurality of dispatcher processes each to receive corresponding detected active client connections from the listener process;
    a plurality of connection queues each to receive detected active client connections from a corresponding dispatcher process; and
    a plurality of agent processes each to receive active client connections from a corresponding connection queue, extract said client requests from the received active client connections and execute the extracted client requests against said database.

7. The apparatus of claim 6
    wherein an agent process executes a client request against the database and sends back a reply related to the client request to the detected active client connection.

8. The apparatus of claim 7 further including a shared socket pair used as an inbound queue for a dispatcher process.

9. The apparatus of claim 7 further including:
    means for using multiple queues to pass client connections from dispatcher processes to agent processes; and
    means for logically associating queues with agent process pools each maintaining an affinity with an associated queue.

10. A computer program product apparatus including a computer readable medium tangibly embodying computer executable instructions for directing a data processing system to implement a database management system for a database to handle data access by a plurality of client connections to the database, said program product apparatus comprising:
    a listener process to detect active client connections containing client requests;
    a dispatcher process to receive detected active client connections from the listener process;
    a plurality of agent processes to receive the active client connections and execute the client requests against said database; and
    a connection queue to receive the detected active client connections from the dispatcher process and pass the detected active client connections to an agent process, wherein said agent process executes a client request against the database and sends back a reply related to the client request to the detected active client connection;
    wherein detected active client connections are passed from the dispatcher process to an agent process through socket pairs that are private to the dispatcher process and the agent process requests the dispatcher process to pass descriptors for the detected active client connections through a shared socket pair.

11. A method for multiplexing client connections within a database system implemented on a data processing system having a database, said method comprising the steps of:
(a) passing active client connections detected by a listener process to respective agent processes via a plurality of dispatcher processes and connection queues, wherein the detected active client connections each have a request embedded therein and step (a) further includes:
   (a.1) passing the detected active client connections from the listener process to corresponding dispatcher processes;
   (a.2) passing the detected active client connections from the dispatcher processes to corresponding connection queues; and
   (a.3) passing the detected active client connections from the connection queues to corresponding agent processes;
(b) executing a request against the database by an agent process, wherein the request is extracted from a detected client connection by that agent process; and
(c) handling shared memory read and write operations by the agent process to process the embedded request.

12. The method of claim 11, wherein step (c) further includes:
(c.1) sending a reply related to the embedded request from the agent process back to the detected active client connection.

13. The method of claim 12, wherein step (a.1) further includes:
(a.1.1) using a shared socket pair as an inbound queue for a dispatcher process.

14. The method of claim 12 wherein step (a.3) further includes:
(a.3.1) using multiple queues to pass requests client connections from dispatcher processes to agent processes; and
(a.3.2) logically associating queues with agent process pools each maintaining an affinity with an associated queue.

15. A method for multiplexing client connections within a database system implemented on a data processing system having a database, said method comprising the steps of:
(a) passing active client connections detected by a listener process to respective agent processes, wherein the detected active client connections each have a request embedded therein, wherein step (a) further includes:
   (a.1) passing detected active client connections from the listener process to a dispatcher process;
   (a.2) passing the detected active client connections from the dispatcher process to a connection queue; and
   (a.3) passing the detected active client connections from the connection queue to the agent process, wherein step (a.3) further includes:
      (a.3.1) passing detected active client connections from the dispatcher process to the agent process through socket pairs that are private to the dispatcher process; and
      (a.3.2) requesting the dispatcher process via the agent process to pass descriptors for the detected active client connections through a shared socket pair;
(b) executing a request against the database by an agent process, wherein the request is extracted from a detected client connection; and
(c) handling shared memory read and write operations by the agent process to process the embedded request, wherein step (c) further includes:
   (c.1) sending a reply related to the embedded request from the agent process back to the detected active client connection.

16. A computer program product having a computer-readable medium tangibly embodying computer executable instructions for multiplexing client connections within a database system implemented on a data processing system having a database, the computer program product comprising:
a first set of computer executable instructions for a listener process to detect active client connections and pass the active client connections to respective agent processes via a plurality of dispatcher processes and connection queues, wherein the detected active client connections each have a request embedded therein and said first set includes:
   a first series of computer executable instructions for passing the detected active client connections from the listener process to corresponding dispatcher processes;
   a second series of computer executable instructions for passing the detected active client connections from the dispatcher processes to corresponding connection queues;
   a third series of computer executable instructions for passing the detected active client connections from the connection queues to corresponding agent processes;
a second set of computer executable instructions for an agent process to execute a request against the database, wherein the request is extracted from a detected client connection; and
a third set of computer executable instructions for handling shared memory read and write operations by the agent process to process the embedded request.

17. The computer program product of claim 16, wherein said third set includes computer executable instructions for sending a reply related to the embedded request from the agent process back to the detected active client connection.

18. The computer program product of claim 17, wherein said first series further includes computer executable instructions for using a shared socket pair as an inbound queue for a dispatcher process.

19. The computer program product of claim 17, wherein said third series further includes:
computer executable instructions for using multiple queues to pass client connections from dispatcher processes to agent processes and for logically associating queues with agent process pools each maintaining an affinity with an associated queue.

20. A computer program product having a computer-readable medium tangibly embodying computer executable instructions for multiplexing client connections within a database system implemented on a data processing system having a database, the computer program product comprising:
a first set of computer executable instructions for a listener process to detect active client connections, wherein the detected active client connections each have a request embedded therein, wherein said first set includes:

a first series of computer executable instructions for passing the detected active client connections from the listener process to a dispatcher process;

a second series of computer executable instructions for passing the detected active client connections from the dispatcher process to a connection queue; and a third series of computer executable instructions for passing the detected active client connections from the connection queue to an agent process, wherein said third series further includes:

computer executable instructions for passing detected active client connections from the dispatcher process to the agent process through socket pairs that are private to the dispatcher process and for requesting the dispatcher process via the agent process to pass descriptors for the detected active client connections through a shared socket pair;

a second set of computer executable instructions for an agent process to execute a request against the database, wherein the request is extracted from a detected client connection; and a third set of computer executable instructions for handling shared memory read and write operations by the agent process to process the embedded request, wherein said third set includes computer executable instructions for sending a reply related to the embedded request from the agent process back to the detected active client connection.

21. In a database system implemented on a data processing system, a communication multiplexor for executing requests against data contained in a database stored in the data processing system, comprising:

a processing system to multiplex client connections within said database system, including:
  a listener process to detect active client connections containing client requests;
  a plurality of dispatcher processes each to receive corresponding detected active client connections from the listener process;
  a plurality of connection queues each to receive detected active client connections from a corresponding dispatcher process; and
  a plurality of agent processes each to receive active client connections from a corresponding connection queue, extract said client requests from the received active client connections and execute the extracted client requests against said database.

22. The multiplexor of claim 21,
wherein an agent process executes a client request against the database and sends back a reply related to the client request to the detected active client connection.

23. The multiplexor of claim 22, wherein said processing system further includes a shared socket pair used as an inbound queue for a dispatcher process.

24. The multiplexor of claim 22, wherein said processing system further includes:
  means for using multiple queues to pass client connections from dispatcher processes to agent processes; and
  means for logically associating queues with agent process pools each maintaining an affinity with an associated queue.

25. In a database system implemented on a data processing system, a communication multiplexor for executing requests against data contained in a database stored in the data processing system, comprising:

a processing system to multiplex client connections within said database system, including:
  a listener process to detect active client connections containing client requests;
  a dispatcher process to receive the detected active client connections from the listener process;
  a plurality of agent processes to receive the active client connections and execute the client requests against said database; and
  a connection queue to receive the detected active client connections from the dispatcher process and pass the detected active client connections to an agent process, wherein said agent process executes a client request against the database and sends back a reply related to the client request to the detected active client connection;
wherein detected active client connections are passed from the dispatcher process to an agent process through socket pairs that are private to the dispatcher process and the agent process requests the dispatcher process to pass descriptors for the detected active client connections through a shared socket pair.

26. A computer program product apparatus having a computer-readable medium tangibly embodying computer executable instructions for implementing a communication multiplexor on a data processing system having a database, wherein said communication multiplexor executes requests from client connections against data contained in said database, the program product apparatus comprising:

a multiplexor process to multiplex client connections within a database system including:
  a listener process to detect active client connections containing client requests;
  a plurality of dispatcher processes each to receive corresponding detected active client connections from the listener process;
  a plurality of connection queues each to receive detected active client connections from a corresponding dispatcher process; and
  a plurality of agent processes each to receive active client connections from a corresponding connection queue, extract said client requests from the received active client connections and execute the extracted client requests against said database.

27. The apparatus of claim 26,
wherein an agent process executes a client request against the database and sends back a reply related to the client request to the detected active client connection.

28. The apparatus of claim 27 further including a shared socket pair used as an inbound queue for a dispatcher process.

29. The apparatus of claim 27 further including:
  means for using multiple queues to pass client connections from dispatcher processes to agent processes; and
  means for logically associating queues with agent process pools each maintaining an affinity with an associated queue.

30. A computer program product apparatus having a computer-readable medium tangibly embodying computer executable instructions for implementing a communication multiplexor on a data processing system having a database, wherein said communication multiplexor executes requests from client connections against data contained in said database, the program product apparatus comprising:

a multiplexor process to multiplex client connections within a database system including:

a listener process to detect active client connections containing client requests;

a dispatcher process to receive the detected active client connections from the listener process;

a plurality of agent processes to receive the active client connections and execute the client requests against said database; and a connection queue to receive the detected active client connections from the dispatcher process and pass the detected active client connections to an agent process, wherein said agent process executes a client request against the database and sends back a reply related to the client request to the detected active client connection;

wherein detected active client connections are passed from the dispatcher process to an agent process through socket pairs that are private to the dispatcher process and the agent process requests the dispatcher process to pass descriptors for the detected active client connections through a shared socket pair.

* * * * *